United States Patent

[11] 3,540,356

[72] Inventor Daniel Lecomte,
 Saint Etienne du Rouvray, France
[21] Appl. No. 806,835
[22] Filed March 13, 1969
[45] Patented Nov. 17, 1970
[73] Assignee Societe Anonyme dite: CRAF'SAC,
 Petit-Quevilly, France
[32] Priority March 15, 1968, Feb. 4, 1969
[33] France
[31] Nos. 144,075 and 6,902,484

[54] METHOD OF MANUFACTURING PAPER BAGS PROVIDED WITH AN INNER LINING MEMBER OF PLASTIC MATERIAL
 4 Claims, 8 Drawing Figs.
[52] U.S. Cl................................................. 93/35,
 229/55
[51] Int. Cl........................................... B31b 49/04
[50] Field of Search.......................................... 229/55;
 93/35, 35RM, 35PT, 35

[56] References Cited
 UNITED STATES PATENTS
 3,366,018 1/1968 Civitello.................... 93/35X
 3,397,622 8/1968 Goodwin.................... 93/35

Primary Examiner—Bernard Stickney
Attorney—Nolte and Nolte

ABSTRACT: A continuous tube intended to be cut up in tube lengths is formed including an inner lining member of plastic material and one or more paper plies folded around said lining member and adhesively bonded longitudinally together, a transverse stripe of releasing, i.e. antiadhesive material, is applied upon the inner surface of the inner paper ply on a width corresponding to one side of the flattened tube, in the regions intented to form at least one of the two ends of each length of tube after the continuous tube has been cut up, at least one end of the inner lining member of a tube length is welded by heating across the paper enveloping the lining member at the level of the releasing stripe, and the bottom or bottoms of the tube length are formed in the usual manner.

Patented Nov. 17, 1970

3,540,356

INVENTOR
DANIEL LECOMTE

BY

*Nolte & Nolte*

ATTORNEYS

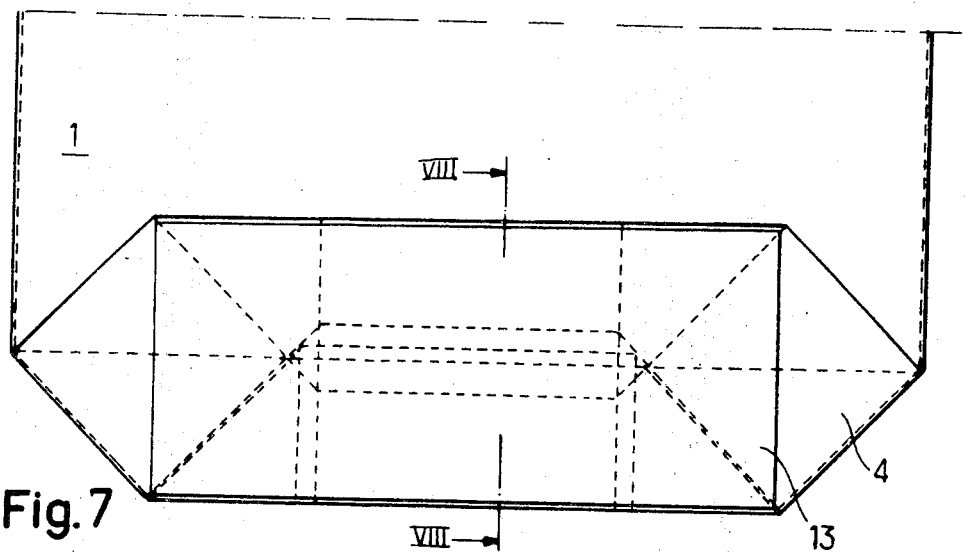
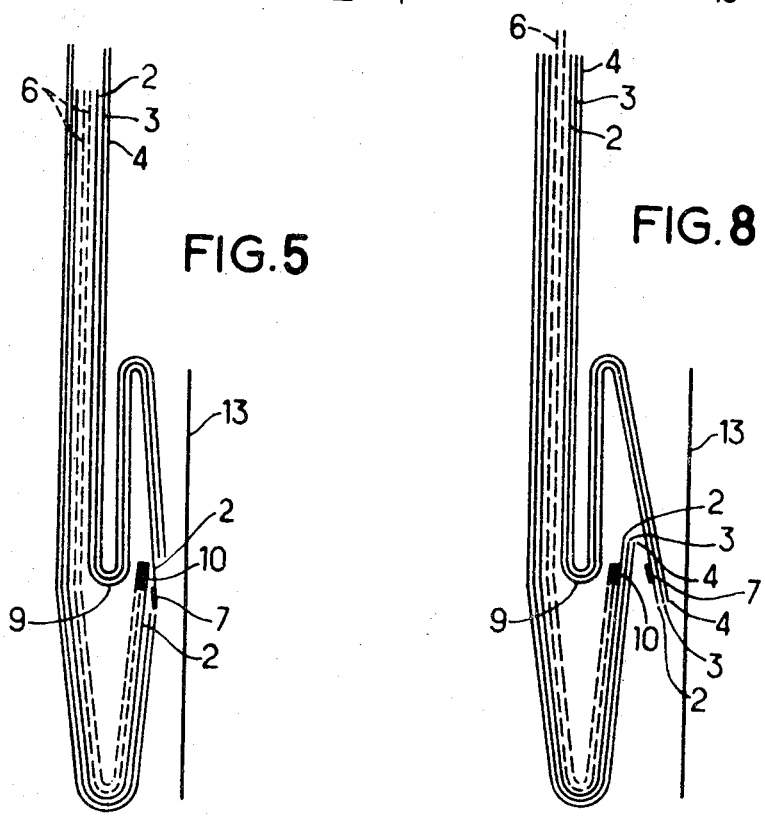

METHOD OF MANUFACTURING PAPER BAGS PROVIDED WITH AN INNER LINING MEMBER OF PLASTIC MATERIAL

The invention relates to paper bags comprising one or more paper plies or layers, which contain an inner lining member of plastic material and including an adhesively built-up bottom, or two adhesively built-up bottoms, one of which may be provided with a filling valve.

It is known that in the manufacture of such bags it is desirable that the lining member be sealed so as to be completely tight, in order to protect the contents from moisture. However, one has never succeeded in actually welding the lining member, and had necessarily to satisfy himself with adhesive bonding joints, which are all the more tricky as the lining member is usually made of polyethylene, which is very difficult to be adhesively bonded, the step being made still more difficult by the diamond fashion folding of the bottoms of the bag, which are intended to put the bag into the shape of a right-angled parallelepiped.

Now, the purpose of the invention is to work out a new method of manufacturing bags having at least one adhesively built-up bottom, which method makes it possible to achieve easily a perfect closure of the inner lining member, of plastic material merely by welding, while allowing the bag to be set into its normal flat condition upon being manufactured and to take the shape of a right-angled parallelepiped during filling.

This invention has for its object a new method of manufacturing bags provided with an inner lining member of plastic material and comprising at least one adhesively built-up bottom, essentially characterized by the fact that, in a first step, a continuous flattened paper tube comprising one or more plies is formed on a bag tubing machine, a tubular lining member of plastic material—whose expanded size substantially corresponds to that of the inner paper ply— being introduced continuously into the interior of the said tube, previous to the longitudinal adhesive bonding of the paper plies, and a transverse stripe of releasing (i.e. antiadhesive) material being applied upon the inner surface of the said inner paper ply, on a width corresponding to one side of the flattened tube, in the regions intended to form at least one of the two ends of each length of tube after the continuous tube has been cut up; in a second step, subsequent to cutting up the continuous tube into tube lengths, a weld line is performed at at least one end of the tube length, on the edge of the lining member, by direct heating, by dielectric heating or by ultrasonics, acting across the thickness of the paper, at the level of the area coated with the releasing material; and, finally, in a third step, the folding and adhesive build up of at least one bottom of the bag is effected in a manner known per se.

Further features and advantages of the invention will appear from the disclosure of a few illustrative embodiments, which will be given hereinafter with reference to the accompanying diagrammatical drawings, in which:

FIG. 5 is a sectional view taken along line V-V of FIG. 4;

FIG. 7 shows a corresponding completed bottom; and

FIG. 8 is a sectional view taken along line VIII-VIII of FIG. 7.

In the examples illustrated it is contemplated to form a bag comprising three plies or layers of paper, it being understood that the invention may also be carried out with a number of paper plies smaller or larger than three.

Figure 1:
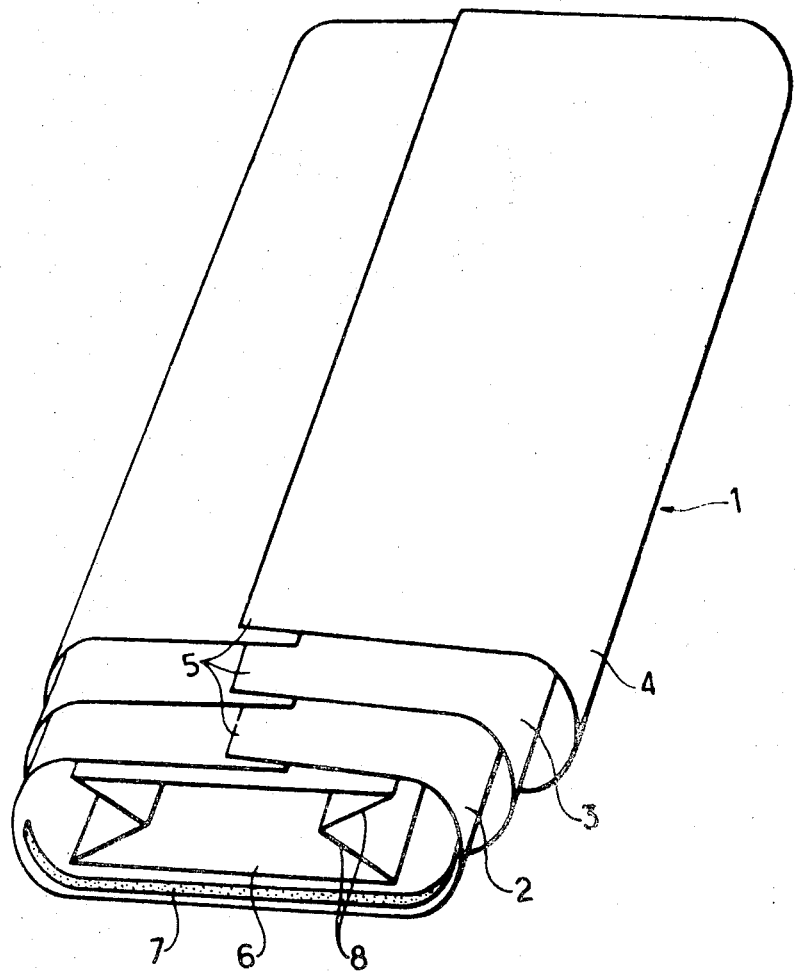
FIG. 1 is a perspective view of a length of tube.

As will be seen from FIG. 1, the method according to the invention comprises forming in a conventional tubing machine a number of lengths of tube 1 such as shown in that FIG. and including, e.g., three plies of paper 2, 3 and 4 adhesively bonded upon themselves lengthwise along bonding lines 5, which may be staggered if desired. In this example it is desired to achieve staggered bonding of the bag bottoms and, to this end, the successive edges of the paper plies are staggered at each end of the tube, as shown in FIG. 1. This is obtained in the conventional way by providing a series of longitudinally staggered transverse rupture scores on the paper webs being unwound in the bag-tubing machine, whereby, upon effecting continuous folding and pasting of the tubes, the latter may be severed with staggered cuts, by merely applying a longitudinal pull. It is also known that such a tube may be built up around a lining member of plastic material, which is continuously unwound and is likewise provided with rupture scores.

According to one feature of the invention, the bag-tubing machine has added to it a device adapted to apply upon the inner side of the innermost paper ply 2 a series of transverse stripes 7 consisting of a coating of releasing, i.e. antiadhesive material. Such stripes are placed at desired locations selected so that, upon accomplishment of the severance, they be located adjacent at least one of the ends of the paper ply 2 of a length of tube. On the other hand, and in accordance with an essential feature of the invention, the stripes 7 extend only about half the width of the paper web of ply 2, so that they are present to one side only of the lining member 6.

Figure 2:
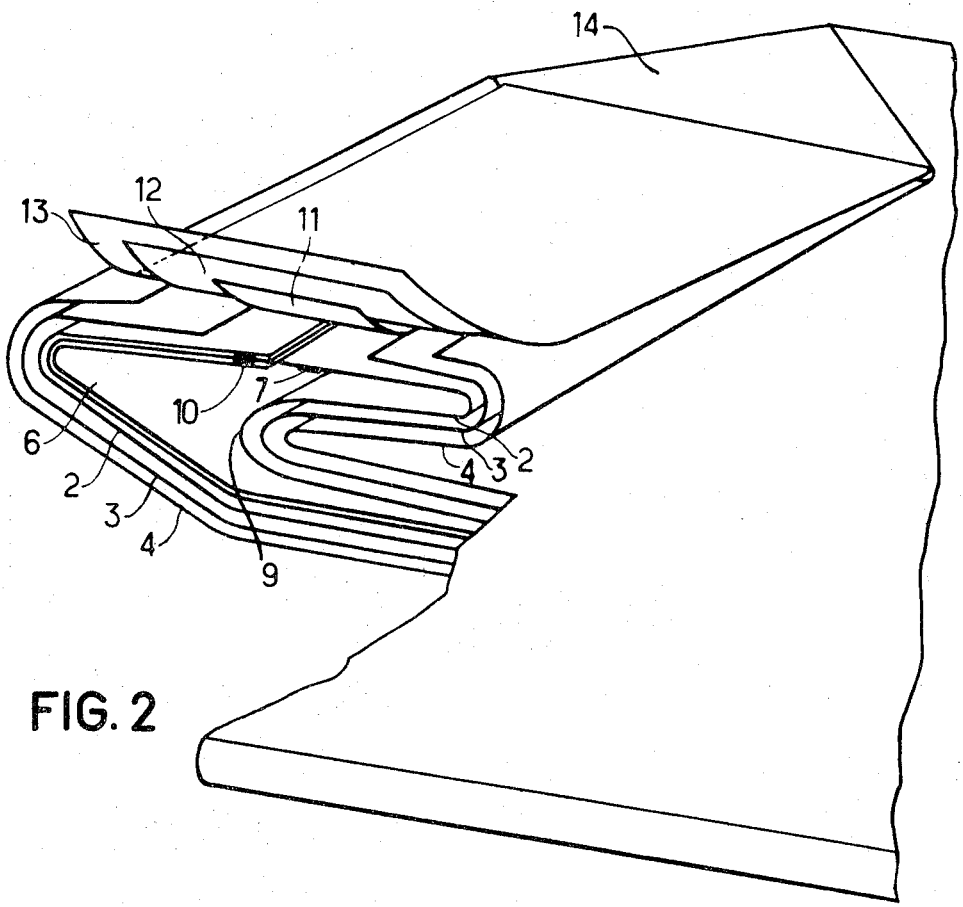
FIG. 2 is a fragmentary perspective view, partly broken away, of one of the bottoms of a bag made from such length of tube.

In the embodiment of FIGS. 1, 2, the lining member 6 comprises side portions 8 folded in bellows fashion, so that when the bag will subsequently take the shape of a parallelepiped, the outer surfaces of the lining member 6 will form the larger side surfaces, while the portions that make up the bellows will form the smaller side surfaces.

The various lengths of tube 1, which are separated from each other at the end of the bag-tubing machine, are further taken over by a bottom folding and pasting machine, where they move, transversely in this instance. Advantage is taken of this opportunity, to provide the latter machine with suitable electrodes, whereby, while the bottom for the bag is being built up, a weld line is formed exactly at the level of the region corresponding to a stripe 7, at the respective end of each length of lining member. Such welds may be performed by any known means, such as direct heating, dielectric heating or ultrasonic fusion. Each weld is effected across the thickness of the paper overlaying the end to be welded of the lining member, such weld uniting the two walls of the lining member in the plane portion of the latter, while also uniting the four layers of plastic material at the bellows-shaped edges.

When the end of one length of tube 1 is opened in view of performing the folding steps with the object of building up the bottom, the lining member 6, which has just been welded as aforesaid, remains bonded, by its weld line, to one of the inner surfaces of the paper ply 2, while the other surface of the lining tube, the one carrying the stripe of releasing material 7, comes unstuck from the paper ply. This makes it possible to effect, as shown in FIG. 2, the conventional build up intended to form a bottom, with the paper plies 2, 3 and 4 parting from the folding line 9 and on, while, on the contrary, the walls of the lining member 6 remain contiguous up to the weld line indicated by 10 in the FIG., along which line they adhere to one side of the paper ply 2.

The bottom may then be completed by bonding stepped strips of paper 11, 12 and 13, as shown in FIG. 2, which strips become stuck to the plies 2, 3 and 4, respectively, the latter being themselves staggered. As will be seen, the presence of the lining member does not interfere with the conventional formation of such adhesively built-up bottoms. Likewise, at each end of the bottom, in the portions 14 that are bent back mitre fashion, the folding and the achievement of those portions are not affected by the lining member, since the latter latter does not stretch up to the inside of such portions, owing to the provision of the bellows 8. The other adhesively built-up bottom is established in an absolutely similar manner at the other end of the bag, though the plies will be reversely staggered in the latter instance. Moreover, a filling valve may be provided in one of the bottoms in the conventional way.

It will easily be seen that, during the filling of the bag, the outer sheathing—made up of the three paper plies and the adhesively built-up bottoms—will take the shape of a right-angled parallelepiped, as is known per se, while the plastic lining member 6, which is tightly weld sealed at both ends, also comes to form a sheathing of same shape inside the former one, owing to the bellows 8 getting unfolded.

Thus, the method of the invention makes it possible to provide in a simple manner for full tightness of the lining member by welding and, on the other hand, to build up an outer paper sheathing having the regular qualities, using conventional production machines.

In the above-described embodiment provision was made to secure a diamond-shaped opening for the bag and further to bend back the flaps in such a way that the edge of a flap corresponding to the inner paper ply adhering to the edge of the welded lining member be abutted against the inner paper ply corresponding to the other flap, the edges of the other paper plies being set back with respect to the former ones and being connected to each other by means of successive paper strips arranged in staggered relationship.

This results in a minor drawback due to the fact that the developed size of the lining member in an axial section of the bag is slightly less than the developed size of the paper plies, the difference arising from the width taken by the weld and which, though small, is sufficient to involve resilient longitudinal stretching of the lining member during filling.

To do away with this drawback and the hazards resulting therefrom, it is contemplated according to the invention that, during making up of the bottom, the diamond-shaped opening of the length of tube and the folding of the flaps are carried out in such a manner that the weld line of the lining member is located on the median line of the bottom or slightly therebeyond.

FIGS. 3—5 and 6—8 show two examples of the latter embodiment. This makes use of a simple lining member 6, i.e., with no side bellows 8. The longitudinal adhesive joints of the paper plies are not shown in these FIGS.

Figure 4:
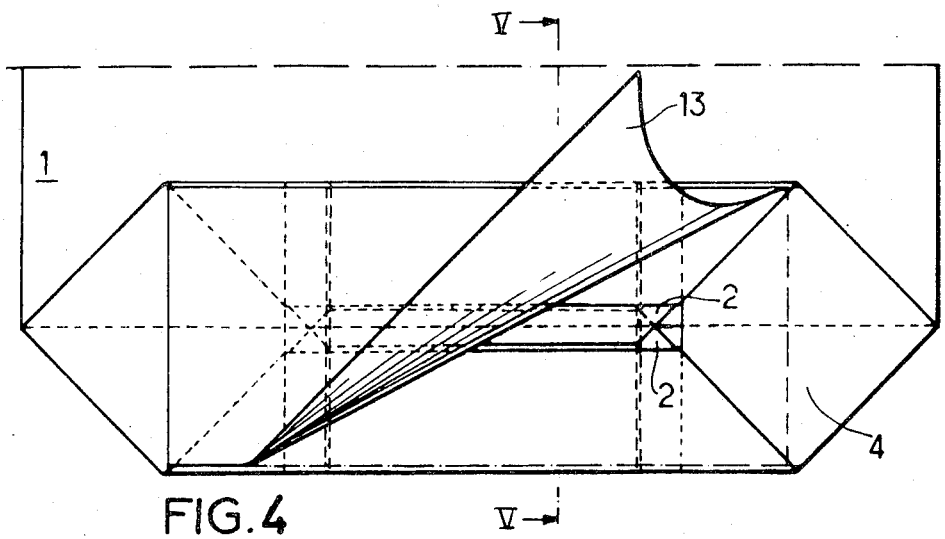
FIG. 4 shows the terminal step of the corresponding bottom.
Figure 3:
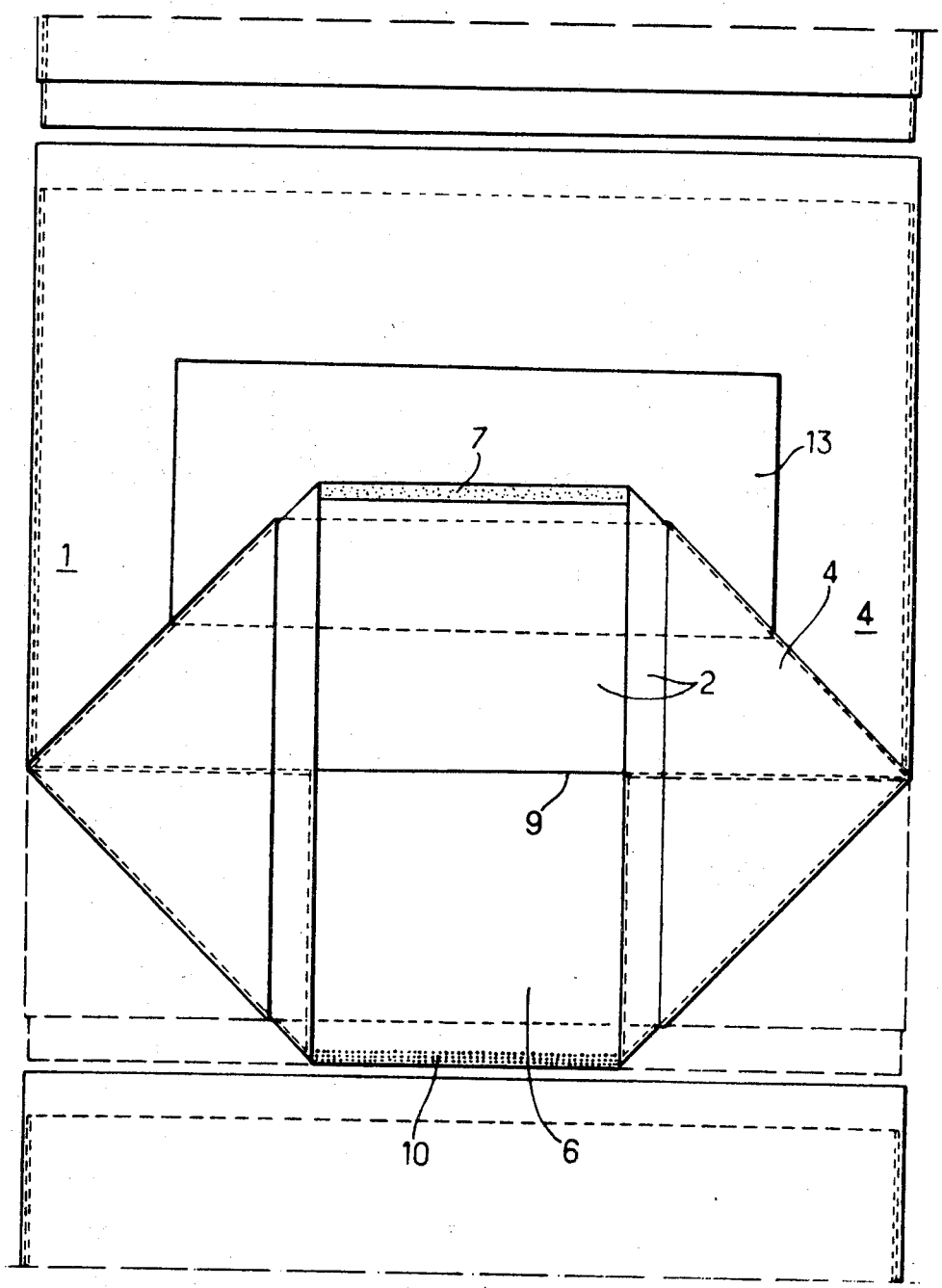
FIG. 3 shows one stage in the manufacturing of a modified embodiment.

In the example illustrated in FIGS. 3—5, the paper plies and the lining member are given straight cuts staggered in such a way that, on the side corresponding to the bottom, the lining member 6 and the inner paper ply 2 extend to a certain width beyond the other plies 3 and 4, which are located at the same level. As before, the ply 2 is provided interiorly, on one side only, with a stripe 7 of releasing material located at the level of the weld of the lining member. The weld 10 is effected by known means across the thickness of the paper ply 2 and secures connexion both between the two walls of the lining member and between the latter and the paper ply 2, at the side of the flap which is not provided with releasing material.

After the bag has been opened diamond fashion, as shown in FIG. 3, the two walls of the lining member 6 appear to lay on the same side, i.e. on the lower flap, the subsequent folding of the flaps being effected in such a way that the weld line 10 comes to lay upon the median line of the bottom, as materialized by the fold 9, or slightly beyond that line, as shown clearly in FIG. 5. As an obvious result, the edges of ply 2 that correspond to the pair of flaps which are bent over one another, overlap mutually as shown in FIGS. 4, 5. Advantage is taken of this fact to bond those two flaps adhesively to each other, so that the bag may subsequently be completed by bonding merely a bottom rectangle 13 instead of the three staggered straps shown in FIG. 2.

Thus, it has been found that, during filling of the bag, the lining member expands to proper volume inside the paper plies without being caused to undergo any stretch, since its expanded size in axial section is at least equal to that of the paper plies. A greater safety is achieved as a result.

On the other hand, it has been found that, owing to the complementary nature of the cuts made in the individual paper plies and in the lining member when they are being manufactured on the bag-tubing machine, the fact that the paper plies 3 and 4 are retracted, bottom side, with respect to ply 2 and lining member 6 involves the obvious result that, at the open side of the bag, those plies 3 and 4 extend, on the contrary, beyond the ply 2 and the lining member 6. However, using a suitable equipment, one may succeed in achieving a transverse weld, whereby to fasten the lining member at the level of the open side of the bag, effecting such weld across the thickness of the three paper plies on each face.

Figure 6:
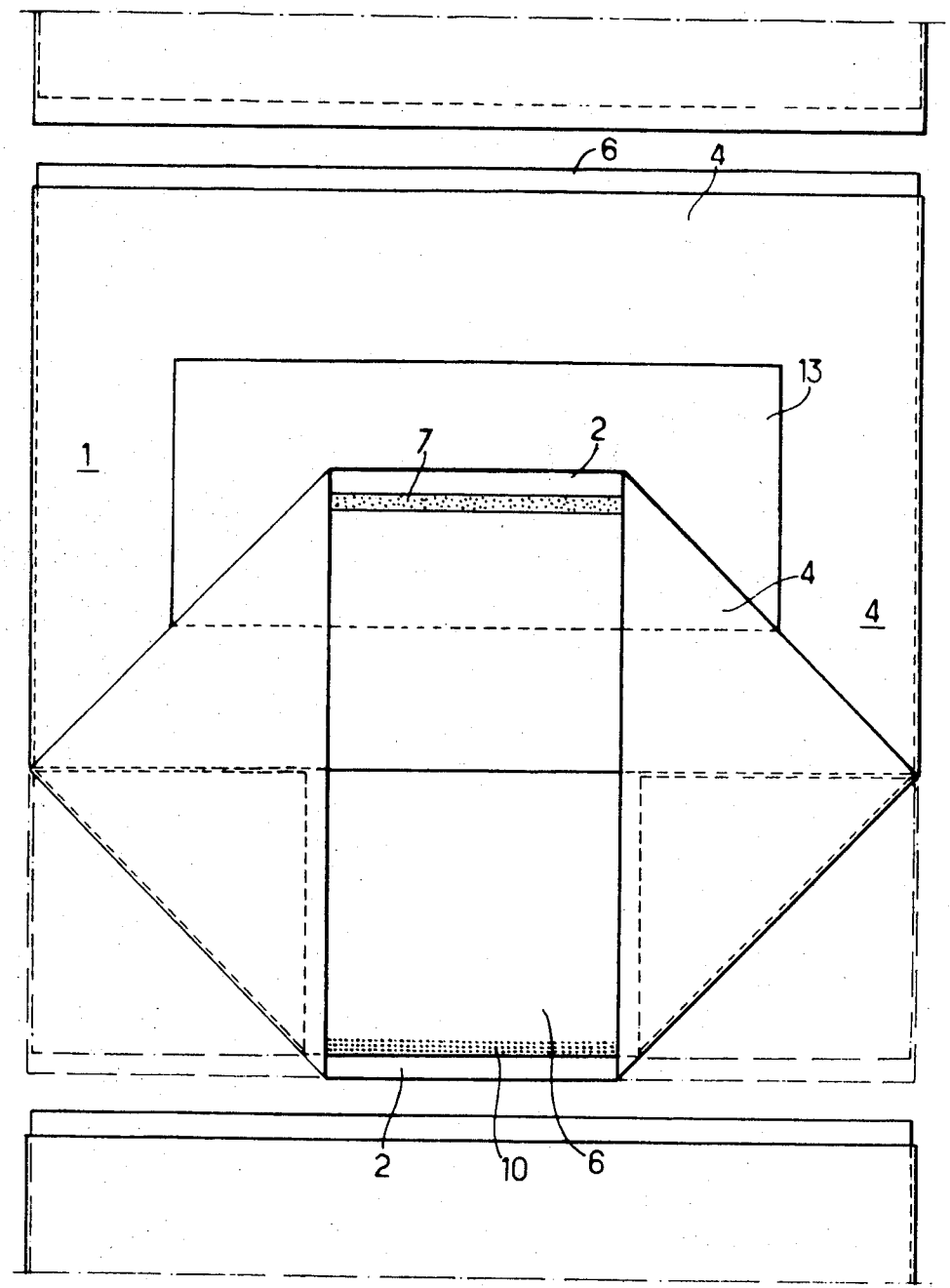
FIG. 6 shows the terminal step of a further modification of the invention.

This capability quite naturally leads to the embodiment shown in FIGS. 6 to 8, where one proceeds exactly in the manner shown in FIGS. 3—5, with the only difference that the three paper plies 2, 3 and 4 are given straight cuts located at the same level and lying beyond the edge of the lining member 6, bottom side. A traverse weld 10 is then effected across the thickness of the three paper plies, a releasing stripe 7 being applied on one side only of the inner ply 2, the weld 10 and releasing stripe being however, in this instance, set back with respect to the edge of the inner ply 2. Moreover, during the production of the tube, the three paper plies 2, 3 and 4 are firmly bonded to each other along their edges corresponding to the bottom. Locating the weld 10, as before, on the median line of the bottom or slightly beyond that line results in achieving an overlap of all the plies 2, 3 and 4 of one flap by all the plies 2, 3 and 4 of the other flap, as shown in FIG. 8. In this instance too, the bottom may be completed by means of a single bottom rectangle 13.

Thus, at the open end of the bag shown in FIGS. 6 and 8, the lining member 6 extends beyond the common edge of the plies 2, 3 and 4. This will facilitate the light welding of the edge of the said lining member when using the bag. Moreover, it sill easily be seen that the total amount of paper and lining material required remains exactly as before.

It will be understood that the embodiments disclosed in the foregoing are not of limiting nature and may undergo any desirable change without exceeding the scope of the invention. More particularly, the number of paper plies may be smaller or greater than three.

I claim:

1. A method of manufacturing bags provided with an inner lining member of plastic material and comprising at least one adhesively built-up bottom, characterized by the fact that: in a first step, a continuous flattened paper tube comprising at least one ply is formed on a bag-tubing machine, a tubular lining member of plastic material—whose expanded size substantially corresponds to that of the inner paper ply—being introduced continuously into the interior of the said tube, previous to the longitudinal adhesive bonding of the paper plies, and a transverse stripe of releasing material being applied upon the inner surface of the said inner paper ply, on a width corresponding to one side of the flattened tube, in the regions intended to form at least one of the two ends of each length of tube after the continuous tube has been cut up; in a second step, subsequent to cutting up the continuous tube into tube lengths, a weld line is performed at at least one end of the tube length, on the edge of the lining member, by direct heating, by dielectric heating or by ultrasonics, acting across the thickness of the paper, at the level of the area coated with the releasing material; and, finally, in a third step, the folding and adhesive build up of at least one bottom of the bag is effected in a manner known per se.

2. Method as claimed in claim 1, characterized by the fact that the folding of the bottom is achieved in such a way that after folding of the flap including the end portion of the lining member the weld line of the lining member is brought at least up to a location corresponding to that of the median line of the bottom.

3. Method as claimed in claim 2, wherein use is made of a tube comprising several paper plies, characterized by the fact that at the side including the bottom the edges of the inner paper ply and of the lining member are caused to coincide with each other, while the outer paper plies are left in a set back position with respect to the former.

4. Method as claimed in claim 2, wherein use is made of a tube comprising several paper plies, characterized by the fact that at the side including the bottom the lining member is left in a setback position with respect to all the paper plies.